United States Patent
Bampton et al.

(10) Patent No.: US 6,848,163 B2
(45) Date of Patent: Feb. 1, 2005

(54) NANOPHASE COMPOSITE DUCT ASSEMBLY

(75) Inventors: Clifford C. Bampton, Thousand Oaks, CA (US); Thomas J. Van Daam, Simi Valley, CA (US); Daniel E. Matejczyk, West Hills, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/352,307

(22) Filed: Jan. 27, 2003

(65) Prior Publication Data

US 2004/0255460 A1 Dec. 23, 2004

Related U.S. Application Data

(62) Division of application No. 09/945,280, filed on Aug. 31, 2001.

(51) Int. Cl.$^7$ ............................................. B21D 39/00
(52) U.S. Cl. ..................... 29/508; 29/889.5; 29/890.01; 148/689; 285/417
(58) Field of Search ................................ 29/508, 889.5, 29/890.01, DIG. 47; 148/577, 689; 285/417

(56) References Cited

U.S. PATENT DOCUMENTS

| | | | | |
|---|---|---|---|---|
| 1,302,412 A | * | 4/1919 | Murray ..................... 285/288.2 |
| 2,367,206 A | * | 1/1945 | Davis ......................... 29/421.2 |
| 3,727,843 A | * | 4/1973 | Parilla .................... 239/265.35 |
| 3,837,066 A | * | 9/1974 | Mori et al. ................... 29/599 |
| 3,873,139 A | * | 3/1975 | McCabe ................... 285/288.8 |
| 3,885,548 A | * | 5/1975 | Regan ........................... 125/15 |
| 4,077,813 A | * | 3/1978 | Fletcher et al. ............. 148/697 |
| 4,159,217 A | * | 6/1979 | Selines et al. .............. 148/577 |
| 4,333,671 A | * | 6/1982 | Holko ................... 285/148.12 |
| 4,412,869 A | * | 11/1983 | Vernam et al. ............. 148/689 |
| 4,643,779 A | * | 2/1987 | Abbaschian et al. ........ 148/577 |
| 4,818,481 A | * | 4/1989 | Luton et al. ................... 419/67 |
| 5,053,084 A | * | 10/1991 | Masumoto et al. ......... 148/561 |
| 5,054,184 A | * | 10/1991 | Gerard .......................... 29/423 |
| 5,074,762 A | * | 12/1991 | Mechin ...................... 417/409 |
| 5,098,871 A | * | 3/1992 | Ray .......................... 501/95.2 |
| 5,148,965 A | * | 9/1992 | Hayes et al. ................ 228/115 |
| 5,156,316 A | * | 10/1992 | Nied et al. ................... 228/2.1 |
| RE34,442 E | * | 11/1993 | Reiso .......................... 148/550 |
| 5,334,266 A | * | 8/1994 | Kawanishi et al. ......... 148/403 |

(List continued on next page.)

Primary Examiner—Essama Omgba
(74) Attorney, Agent, or Firm—Harness Dickey & Pierce P.L.C.

(57) ABSTRACT

A nanophase composite duct assembly and method of fabricating the same are provided that comprise an ultra-high strength nanophase aluminum alloy duct joined with a ceramic particulate reinforced metal matrix fitting, preferably using solid-state friction welding. The nanophase aluminum alloy duct is fabricated by extruding a billet formed by a process of cryogenic milling the alloy, followed by out-gassing, then hot isostatic pressing. The fitting is fabricated by combining a ceramic particulate with a metal matrix, preferably by powder processing or liquid metal infiltration. Further, the solid-state friction welding may comprise inertial welding, friction stir welding, or a combination thereof. As a result, a lightweight duct assembly is provided for high-pressure liquids such as propellants in rocket engines.

14 Claims, 7 Drawing Sheets

U.S. PATENT DOCUMENTS

| | | | | |
|---|---|---|---|---|
| 5,342,575 A | * | 8/1994 | Nagai | 419/67 |
| 5,352,269 A | * | 10/1994 | McCandlish et al. | 75/351 |
| 5,365,108 A | * | 11/1994 | Anderson et al. | 257/678 |
| 5,561,829 A | * | 10/1996 | Sawtell et al. | 419/13 |
| 5,728,195 A | * | 3/1998 | Eastman et al. | 75/351 |
| 5,766,380 A | * | 6/1998 | Lo et al. | 148/577 |
| 5,805,657 A | * | 9/1998 | Heubeck | 376/457 |
| 5,849,373 A | * | 12/1998 | Barbour et al. | 427/576 |
| 5,856,025 A | * | 1/1999 | White et al. | 428/614 |
| 5,911,845 A | * | 6/1999 | Fukagawa et al. | 148/690 |
| 5,993,575 A | * | 11/1999 | Lo et al. | 148/577 |
| 6,033,624 A | * | 3/2000 | Gonsalves et al. | 419/48 |
| 6,264,719 B1 | * | 7/2001 | Zhang et al. | 75/252 |
| 6,334,911 B2 | * | 1/2002 | Kita et al. | 148/416 |
| 6,368,406 B1 | * | 4/2002 | Deevi et al. | 117/108 |
| 6,449,942 B1 | * | 9/2002 | Dean et al. | 60/257 |
| 6,502,480 B1 | * | 1/2003 | Walker et al. | 74/579 E |
| 2001/0025676 A1 | * | 10/2001 | Taguchi et al. | 148/689 |

* cited by examiner

NANOPHASE COMPOSITE DUCT ASSEMBLY

CROSS REFERENCE TO RELATED APPLICATIONS

This application is a divisional of U.S. patent application Ser. No. 09/945,280 filed on Aug. 31, 2001, presently pending.

FIELD OF THE INVENTION

The present invention relates generally to high-pressure ducting and more particularly to high-pressure liquid ducting for propellants in rocket engines.

BACKGROUND OF THE INVENTION

High-pressure liquid propellant ducts on rocket engines are generally heavy and can represent approximately 10–20 percent of the total weight of the engine. Generally, the ducts comprise a tubular section that is joined to a flange portion at each end thereof to form a section of high-pressure liquid ducting. The section of high-pressure liquid ducting is further joined to another section of ducting or to another component of the rocket engine such as a propellant feed tank or an inlet to the rocket engine of, for example, an aerospace vehicle.

In the known art, high-pressure liquid propellant ducts are fabricated from nickel or iron-based superalloys such as 625 or 718, which have relatively high densities and thus contribute significantly to the weight of a rocket engine. To minimize weight, therefore, the ducts are ideally fabricated from materials with high specific strength and toughness for the tubular sections, which generally perform as pressure vessels. Similarly, the flange portions are fabricated from materials with high specific stiffness and hardness, wherein the flange portion performs primarily as a sealing section.

At the ambient or cryogenic temperatures of typical liquid propellant ducts, superalloys do not have an ideal high specific strength for the tubular section or an ideal high specific stiffness for the flange portion. For example, when a superalloy tubular section has been designed with sufficient strength to accommodate propellant pressure, the associated stiffness is relatively high such that small misalignments of the flange portions results in high stresses therein after assembly of the duct. Further, the assembly stress can represent approximately 60 percent of the total flange loading. Moreover, welding, weld inspection, and any rework necessary during assembly of high-pressure liquid ducts of the known art adds substantial cost to the rocket engine.

High strength aluminum alloys, although approximately one third the density of superalloys, have not been used for propellant ducts for a variety of reasons. Generally, the high strength condition in conventional aluminum alloys is achieved by a solution heat treat, followed by a water quench and age, which introduces constraints on forming, welding, and maximum component section thickness. Unfortunately, the aluminum alloy comprises undesirable residual stresses, anisotropic properties, and susceptibility to stress corrosion as a result of the heat treat, water quenching, and aging processes.

Further, conventional aluminum alloys generally have low stiffness, and thus any potential weight benefits of high specific strength in the stiffness-critical flange portions have not been achievable. Moreover, the high coefficient of thermal expansion of conventional aluminum alloys would require an excessively high preload in steel or superalloy bolts that are used to fasten and seal the flange portions to prevent loosening of the bolts during a chill-down process.

Accordingly, there remains a need in the art for lightweight high-pressure liquid ducts comprising aluminum alloys to provide significant weight savings over superalloy ducting of the known art. The high-pressure liquid ducts should comprise lightweight tubular sections in addition to lightweight flange portions, which are fabricated and assembled using manufacturing techniques applicable to the particular materials employed throughout the ducting.

SUMMARY OF THE INVENTION

In one preferred form, the present invention provides a nanophase composite duct assembly that comprises a high pressure liquid duct formed from an ultra-high strength nanophase aluminum alloy, which is joined with a high-pressure liquid ducting flange formed from a ceramic particulate in a metal matrix such as aluminum. Preferably, the duct is joined with the flange using solid-state friction welding such as inertia welding or friction stir welding, among others, as described in greater detail below.

The nanophase aluminum alloy duct is preferably formed by synthesizing a nanophase aluminum alloy to form a billet, extruding the billet into a predetermined geometrical shape, followed by bending the extruded billet into a profile to form the high-pressure liquid duct. Further, the extruded billet may be flow formed prior to bending in order to achieve a precise wall thickness with relatively tight tolerances for a particular application.

Generally, the nanophase aluminum alloy is synthesized by a powder processing sequence of cryogenic milling, out-gassing, and hot isostatic pressing (HIP) to form the billet. The billet is then extruded into a predetermined geometrical shape such as a cylindrical tube for use in many ducting applications for rocket engines. Further, in order to meet the dimensional requirements of rocket engine and other applications, the extruded billet is further flow formed to reduce the wall thickness of the duct to a desired dimension prior to bending, wherein relatively tight tolerances are maintained along the entire length of the extruded billet. (Generally, flow forming is a manufacturing technique that is used for high precision, high tolerance net shape component fabrication).

In preparation of the extrusion process, a center hole is machined through the center of the billet and an internal liner is secured within the center hole, along with an extrusion mandrel. A leader is then positioned at one end of the billet and a follower is positioned at another end of the billet, and an extrusion jacket is placed over the billet, the leader, and the follower. The billet is then extruded through an extrusion die, along with the internal liner, the extrusion jacket, the leader, and the follower, to form an extruded billet having a predetermined geometrical shape. Furthermore, other extrusion methods commonly known in the art may be employed in accordance with the teachings of the present invention. Accordingly, the preferred extrusion method as described herein shall not be construed as limiting the scope of the present invention.

The high-pressure liquid ducting flange comprising a ceramic particulate in a metal matrix is preferably formed by powder processing or by a liquid metal infiltration process. Further, the metal matrix is preferably aluminum in one form of the present invention. The high-pressure liquid ducting flange in one form comprises a series of radial holes wherein bolts are used to secure the flange to another flange portion or to another component within the systems of, for example, a rocket engine. In another embodiment, the high-pressure liquid ducting flange is a two-piece component comprising a nanophase flange joined to a discontinuously reinforced aluminum (DRA) base, preferably using inertia welding, wherein the nanophase flange is then joined to the high-pressure liquid duct.

The high-pressure liquid duct is joined to the high-pressure liquid ducting flange preferably using solid-state friction welding. The solid-state friction welding may comprise inertia welding or friction stir welding, or a combination of both inertia welding and friction stir welding, among others. Furthermore, the nanophase composite duct assembly may also comprise a collar between the high-pressure liquid duct and the high-pressure liquid ducting flange to further seal and secure the interface therebetween. Similarly, the collar is preferably welded to the high-pressure liquid duct and the high-pressure liquid ducting flange using solid-state friction welding.

Although the present invention is directed to a high-pressure liquid duct within a rocket engine, the invention may also be applicable to other high-pressure ducting applications. Accordingly, the reference to rocket engines throughout the description of the invention herein should not be construed as limiting the scope of the present invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
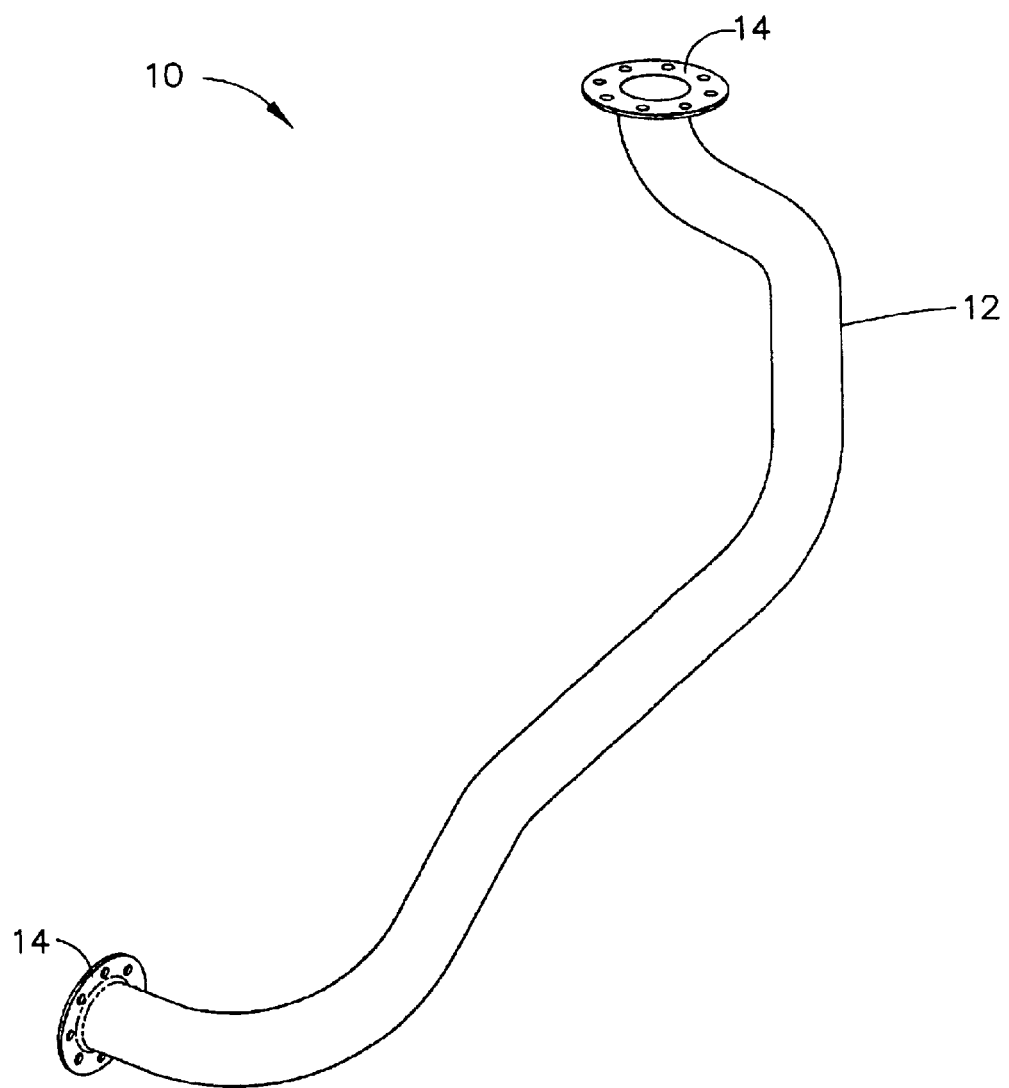
FIG. 1 is an orthogonal view of a nanophase composite duct assembly in accordance with the present invention.

Referring to the drawings, a nanophase composite duct assembly according to the present invention is illustrated and generally indicated by reference numeral 10 in FIG. 1. As shown, the nanophase composite duct assembly 10 generally comprises a high-pressure liquid duct 12 joined to a high-pressure liquid ducting flange 14. Preferably, the high-pressure liquid duct 12 is an ultra-high strength nanophase aluminum alloy and the high-pressure liquid ducting flange 14 is formed from a ceramic particulate in a metal matrix, wherein the metal matrix is preferably aluminum. Accordingly, the nanophase composite duct assembly 10 provides significant weight and cost savings over superalloy high-pressure ducting of the known art.

The high-pressure liquid duct 12 is preferably formed by first synthesizing the nanophase aluminum alloy using powder processing. More specifically, the nanophase aluminum alloy is milled in a cryogenic high-energy ball mill while submerged in liquid nitrogen. After cryogenic milling, the nanophase aluminum alloy is out-gassed and pressed into a billet using hot isostatic pressing (HIP). As a result, a nanophase aluminum alloy billet is produced that is then preferably extruded into predetermined geometrical shape as described in greater detail below. Alternately, the nanophase aluminum alloy billet may be formed into the desired geometrical shape using other methods commonly known in the art such as machining, pultrusion, and die forming, among others. Accordingly, the extrusion process as described herein shall not be construed as limiting the scope of the present invention.

Figure 2:
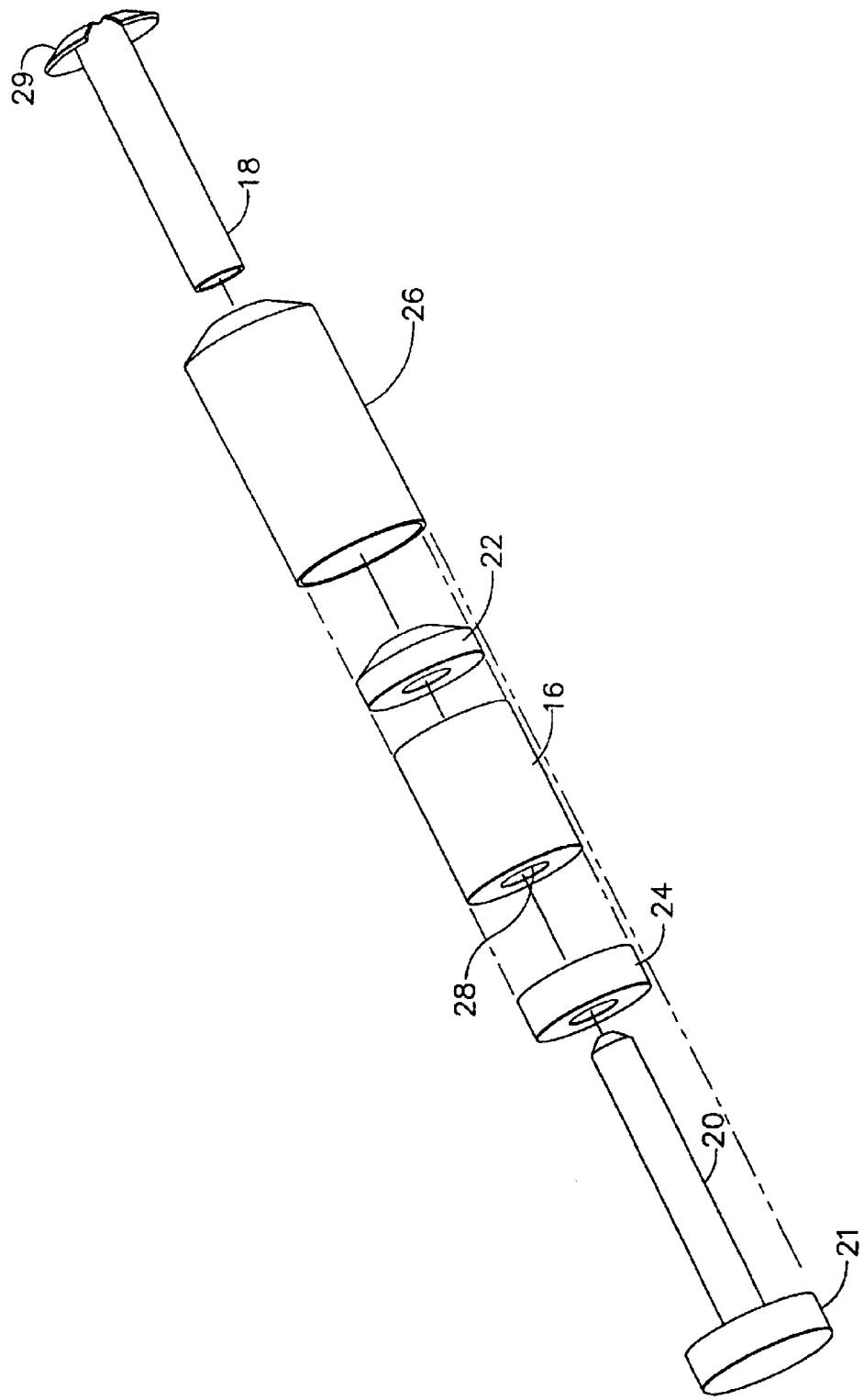
FIG. 2 is an exploded view of a nanophase aluminum alloy billet, an internal sleeve, an extrusion mandrel, a leader, a follower, and an extrusion jacket in accordance with the present invention.
Figure 3:
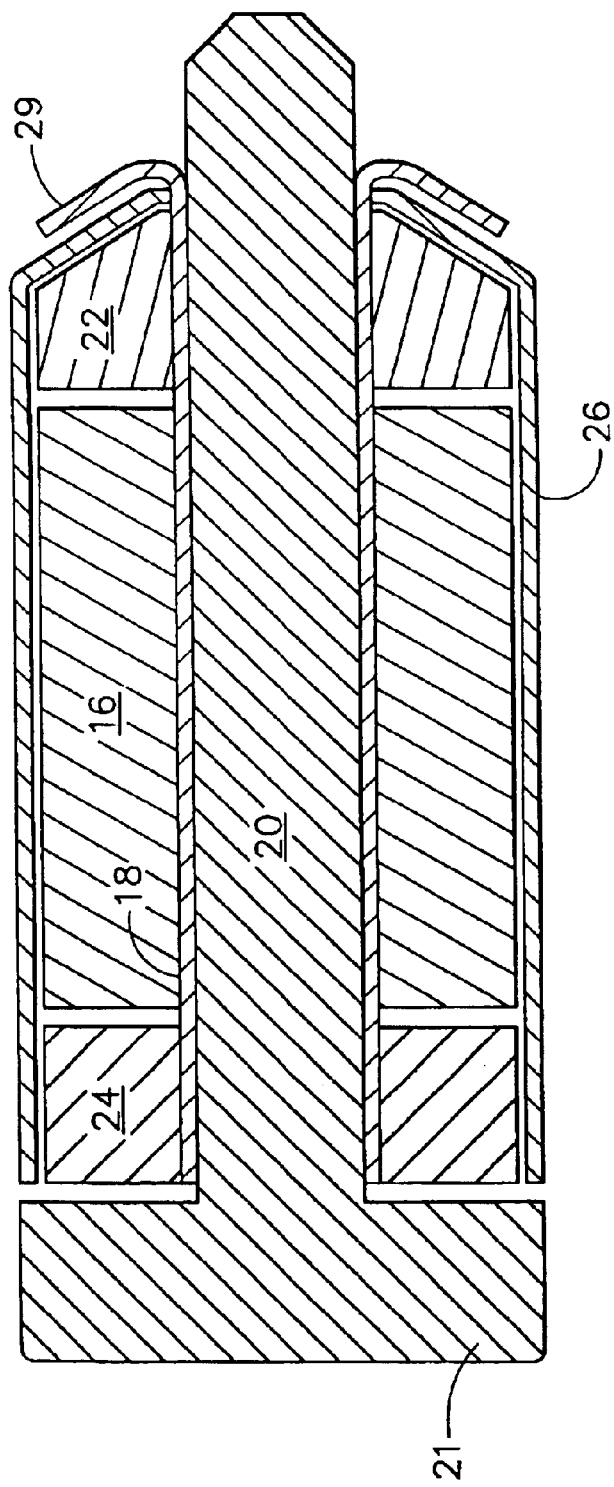
FIG. 3 is a side view of a nanophase aluminum alloy billet, an internal sleeve, an extrusion mandrel, a leader, a follower, and an extrusion jacket in accordance with the present invention.

Referring to FIGS. 2 and 3, a nanophase aluminum alloy billet 16 is illustrated along with an internal sleeve 18, an extrusion mandrel 20, a leader 22, a follower 24, and an extrusion jacket 26, which are used to contain and extrude the nanophase aluminum alloy billet 16 during the extrusion process. As further shown, a center hole 28 is created through the nanophase aluminum alloy billet 16, preferably by machining, and the internal sleeve 18 along with the extrusion mandrel 20 are placed within the center hole 28. Further, the leader 22 is placed at one end of the nanophase aluminum alloy billet 16, and the follower 24 is placed at another end thereof as shown. Generally, the leader 22 and the follower 24 are employed to increase the yield of the extrusion process and to provide consistent material properties.

The mandrel 20 further comprises a collar 21 as shown, which is preferably larger in diameter than the extrusion jacket 26. Further, the mandrel 20 and the internal sleeve 18 extend through the extrusion jacket 26 as illustrated. Accordingly, the internal sleeve 18 is preferably split to form ears 29, which prevent the internal sleeve 18 from slipping during the extrusion process.

As further shown, the extrusion jacket 26 is placed over the nanophase aluminum alloy billet 16, the leader 22, and the follower 24. Generally, the extrusion jacket 26 is provided to encapsulate the nanophase aluminum alloy billet 16 during the extrusion process. Preferably, the extrusion jacket 26, along with the internal sleeve 18, are a copper material, and the leader 22 and the follower 24 are preferably an aluminum material such as 6061-T6.

The extrusion jacket 26, the nanophase aluminum alloy billet 16 with the internal sleeve 18 and the extrusion mandrel 20, the leader 22, and the follower 24 are then placed in an extrusion die (not shown), wherein the mandrel 20 is activated to force the aluminum alloy billet 16 with the internal sleeve 18, along with the extrusion jacket 26, the leader 22, and the follower 24 through the die to form an extruded billet having a predetermined geometrical shape. Preferably, the nanophase aluminum alloy billet 16, the leader 22, and the extrusion jacket 26 are preheated prior to extrusion, while the follower 24 remains at approximately room temperature. Further, the internal sleeve 18 is also preheated, however, at temperatures somewhat higher than the nanophase aluminum alloy billet 16, the leader 22, and the extrusion jacket 26.

In one form of the present invention, a nanophase aluminum alloy billet having a diameter of approximately 9.125 inches is extruded at an area reduction ratio of approximately 20:1. The nanophase aluminum alloy billet 16, the leader 22, and the extrusion jacket 26 are preheated to approximately 400° F., the follower 24 remains at approximately room temperature, the internal sleeve 18 is preheated to approximately between 550° F. and 610° F., and the die temperature is approximately between 350° F. and 500° F. with an extruder having approximately a 5,000 ton capacity. Accordingly, a high-pressure liquid duct is extruded in one form of the present invention that has an outer diameter of approximately 3.35 inches and an inner diameter of approximately 2.80 inches. Additionally, alternate dimensions according to specific applications may also be achieved in accordance with the teachings of the present invention.

Figure 4:
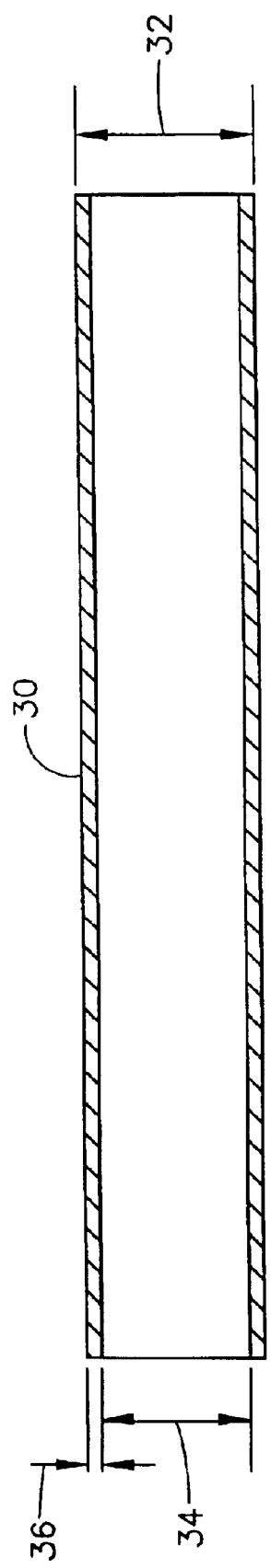
FIG. 4 is a side view of an extruded billet in accordance with the present invention.

Referring to FIG. 4, an extruded billet 30 is illustrated, which is a result of the extrusion process as described herein. The geometrical shape in one form is tubular as shown, however, other geometrical shapes may also be created according to specific application requirements, including constant and non-constant cross sections. As shown, the extruded billet 30 comprises an outer diameter 32, an inner diameter 34, and a wall thickness 36, wherein the outer diameter 32 is significantly smaller than the diameter of the nanophase aluminum alloy billet 16 (not shown) prior to the extrusion process.

Once the nanophase aluminum alloy billet 16 is extruded into the predetermined geometrical shape to form the extruded billet 30, the extruded billet 30 is preferably flow formed to further reduce the wall thickness 36 to a desired dimension. Generally, flow forming produces precise and consistent dimensions along the entire length of the extruded billet 30 within relatively tight tolerances. Accordingly, for applications requiring tighter dimensional control, flow forming is employed after the extrusion process as described herein.

To complete the high-pressure liquid duct 12, the extruded billet undergoes a bending operation to form a profile that corresponds with the final shape of the nanophase composite duct assembly 10. In one form, the geometry of the high-pressure liquid duct 12 is tubular as shown, and thus tube bending operations as commonly known in the art are employed to create the desired profile. Accordingly, further forming methods known in the art may also be employed in accordance with the teachings of the present invention.

The high-pressure liquid duct 12 may also be formed using other methods commonly known in the art such as die forming, pultrusion, or blow forming, among others. Accordingly, the description of extrusion and bending processes herein to form the high-pressure liquid duct 12 shall not be construed as limiting the scope of the present invention.

Figure 5:
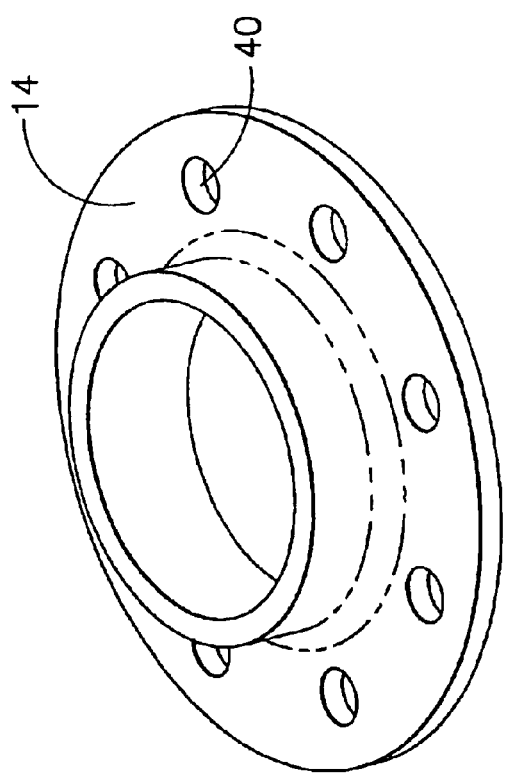
FIG. 5 is an orthogonal view of a high-pressured liquid ducting flange in accordance with the present invention.

Referring to FIG. 5, the high-pressure liquid ducting flange 14 is illustrated, wherein a plurality of radial holes 40 are formed therethrough for bolts (not shown) that secure the high-pressure liquid ducting flange 14 to other portions of rocket engine systems. The high-pressure liquid ducting flange 14 generally comprises ceramic particulates in a metal matrix and is preferably formed by powder processing or liquid metal infiltration. In one form, the ceramic particulate comprises $B_4C$ (boron carbide) in an A356 (aluminum) matrix, wherein the percent by volume of $B_4C$ is approximately 52 percent. Additional materials for the ceramic particulates and the metal matrix, further in various percentages, may also be employed in accordance with the teachings of the present invention. For example, in one form of the present invention, a SiC (silicon carbide) particulate is employed at a volume by percent of approximately 18 percent within an aluminum matrix.

In another form of the present invention, the high-pressure liquid ducting flange 14 is a two-piece component comprising a nanophase flange joined to a discontinuously reinforced metal matrix base (not shown). Preferably, the nanophase flange is joined to the discontinuously reinforced metal matrix base using inertia welding to form the completed high-pressure liquid ducting flange 14. Further, the nanophase flange portion of the high-pressure liquid ducting flange 14 is joined to the high-pressure liquid duct, while the discontinuously reinforced metal matrix base portion is joined to other portions of rocket engine systems as previously described. Accordingly, the nanophase flange portion defines a tapered outer surface that generally transitions from the diameter of the high-pressure liquid duct 12 to the larger diameter of the discontinuously reinforced metal matrix base portion. Preferably, the metal matrix is aluminum for the discontinuously reinforced metal matrix base portion.

Figure 6:
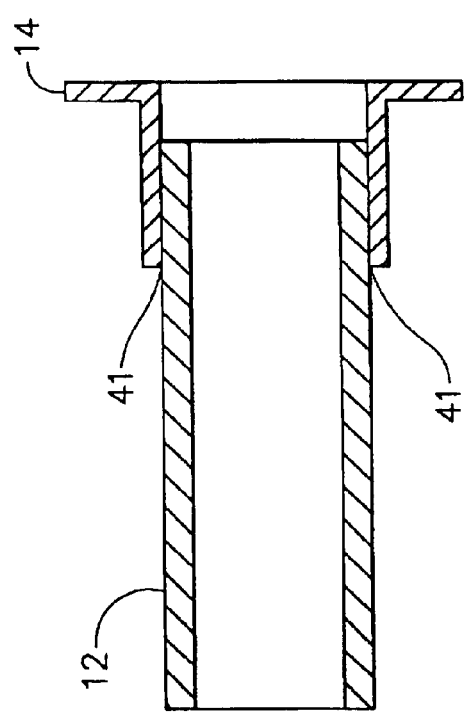
FIG. 6 is a side view of a high-pressure liquid duct joined with a high-pressure liquid ducting flange in accordance with the present invention.

Referring now to FIG. 6, the high-pressure liquid duct 12 is joined to the high-pressure liquid ducting flange 14 along an interface 41 as shown. Preferably, the high-pressure liquid duct 12 and the high-pressure liquid ducting flange 14 are joined using solid-state friction welding along the interface 41. The solid-state friction welding may comprise inertia welding, friction stir welding, or a combination of both inertia welding and friction stir welding, among others commonly known in the art.

Figure 7:
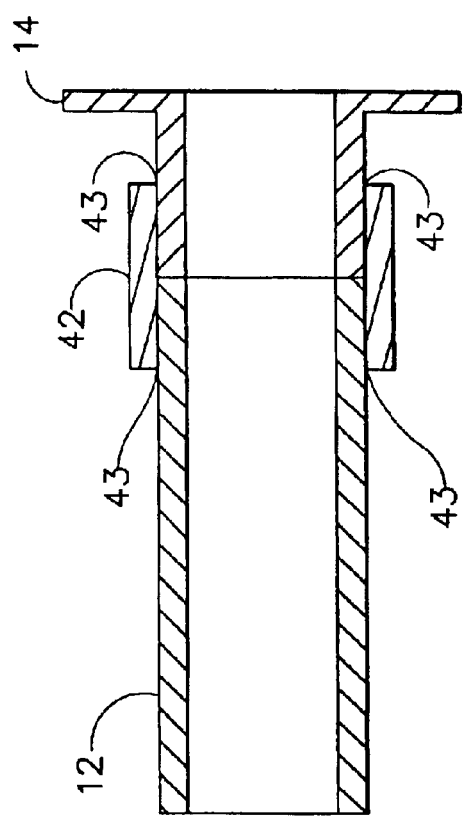
FIG. 7 is a side view of a collar around a high-pressure liquid duct and a high-pressure liquid ducting flange in accordance with the present invention.

As shown in FIG. 7, a collar 42 may also be employed around the joint between the high-pressure liquid duct 12 and the high-pressure liquid ducting flange 14 to further secure and seal the interface therebetween. Similarly, the collar 42 is preferably secured to the high-pressure liquid duct 12 and the high-pressure liquid ducting flange 14 along interfaces 43 using solid-state friction welding as described herein.

Accordingly, a lightweight, low cost composite duct assembly is provided in accordance with the teachings of the present invention. The composite duct assembly comprises a lightweight nanophase aluminum alloy duct that is joined with a lightweight ceramic particulate reinforced aluminum matrix flange, which together with the joining methods as described herein provide significant weight savings over superalloy ducting of the known art.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. A high-pressure liquid propellant duct formed by the process of:
    synthesizing a nanophase aluminum alloy to form a nanophase aluminum alloy billet;
    extruding the nanophase aluminum alloy billet into an extruded billet having a predetermined geometrical shape; and bending the extruded billet into a profile to form the high-pressure liquid duct.

2. The high-pressure liquid propellant duct of claim 1 further comprising a process step of flow forming the extruded billet before bending the extruded billet.

3. The high-pressure liquid propellant duct of claim 1, wherein the nanophase aluminum alloy is synthesized by a process of:
cryogenic milling the nanophase aluminum alloy;
out-gassing the nanophase aluminum alloy; and
hot isostatic pressing the nanophase aluminum alloy to form the nanophase aluminum alloy billet.

4. The high-pressure liquid propellant duct of claim 1, wherein extruding the nanophase aluminum alloy billet further comprises a process of:
machining a center hole through the nanophase aluminum alloy billet;
securing an internal sleeve within the center hole;
positioning a leader at one end of the nanophase aluminum alloy billet;
positioning a follower at another end of the nanophase aluminum alloy billet;
securing an extrusion mandrel within the internal sleeve, the leader, the billet, and the follower; and
placing an extrusion jacket over the nanophase aluminum alloy billet, the leader, and the follower,
wherein the nanophase aluminum alloy billet, the leader, the follower, the extrusion jacket, and the internal sleeve are extruded through an extrusion die.

5. The high-pressure liquid propellant duct of claim 4, wherein the extrusion jacket is copper.

6. The high-pressure liquid propellant duct of claim 4, wherein the internal sleeve is copper.

7. The high-pressure liquid propellant duct of claim 4, wherein the leader and follower are aluminum.

8. The high-pressure liquid propellant duct of claim 1, wherein the nanophase aluminum alloy billet is extruded at an area reduction ratio of approximately 20:1.

9. A duct assembly comprising:
a high-pressure liquid propellant duct formed from a nanophase aluminum alloy, and
a high-pressure liquid ducting flange formed from a ceramic particulate in a metal matrix,
wherein the high-pressure liquid propellant duct and the high-pressure liquid ducting flange are joined by solid-state friction welding.

10. The duct assembly of claim 9, wherein the solid-state friction welding further comprises inertia welding.

11. The duct assembly of claim 9, wherein the solid-state friction welding further comprises friction stir welding.

12. The duct assembly of claim 9, wherein the solid-state friction welding further comprises a combination of inertia welding and friction stir welding.

13. The duct assembly of claim 9 further comprising a collar disposed around the high-pressure liquid propellant duct and the high-pressure liquid ducting flange.

14. The duct assembly of claim 13, wherein the collar is welded to the high-pressure liquid propellant duct and the high-pressure liquid ducting flange.

* * * * *